Patented May 9, 1933

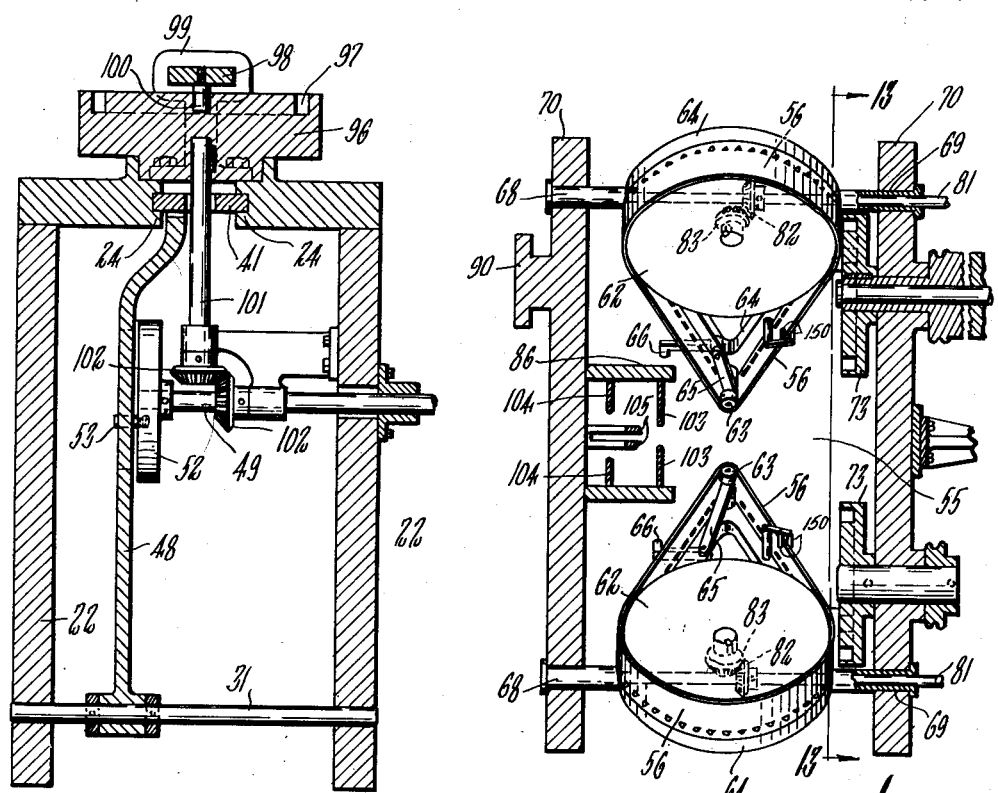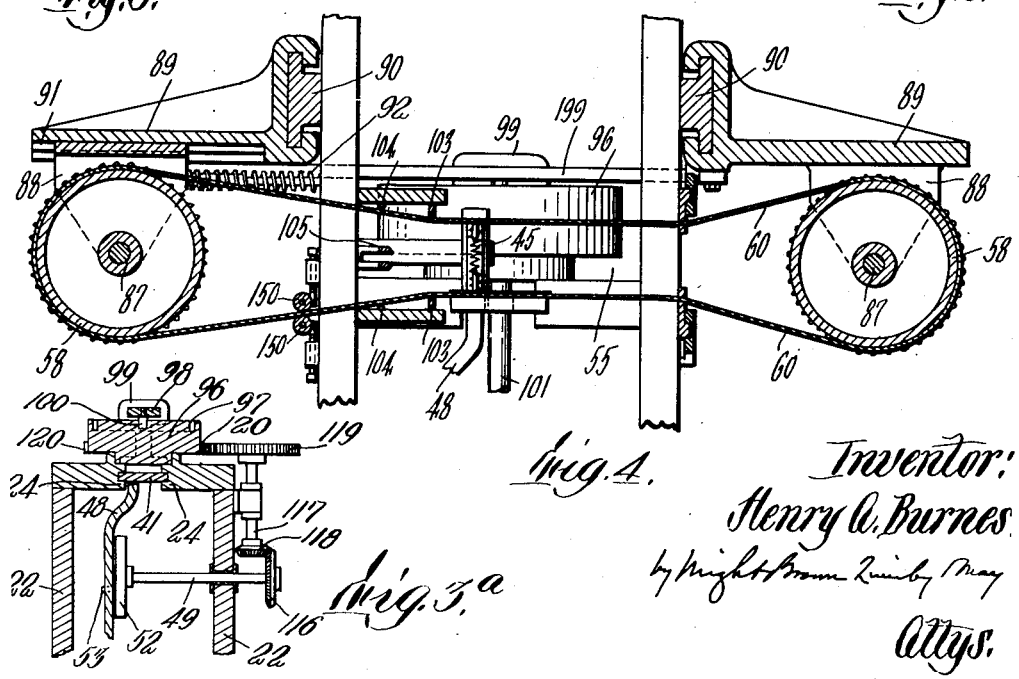

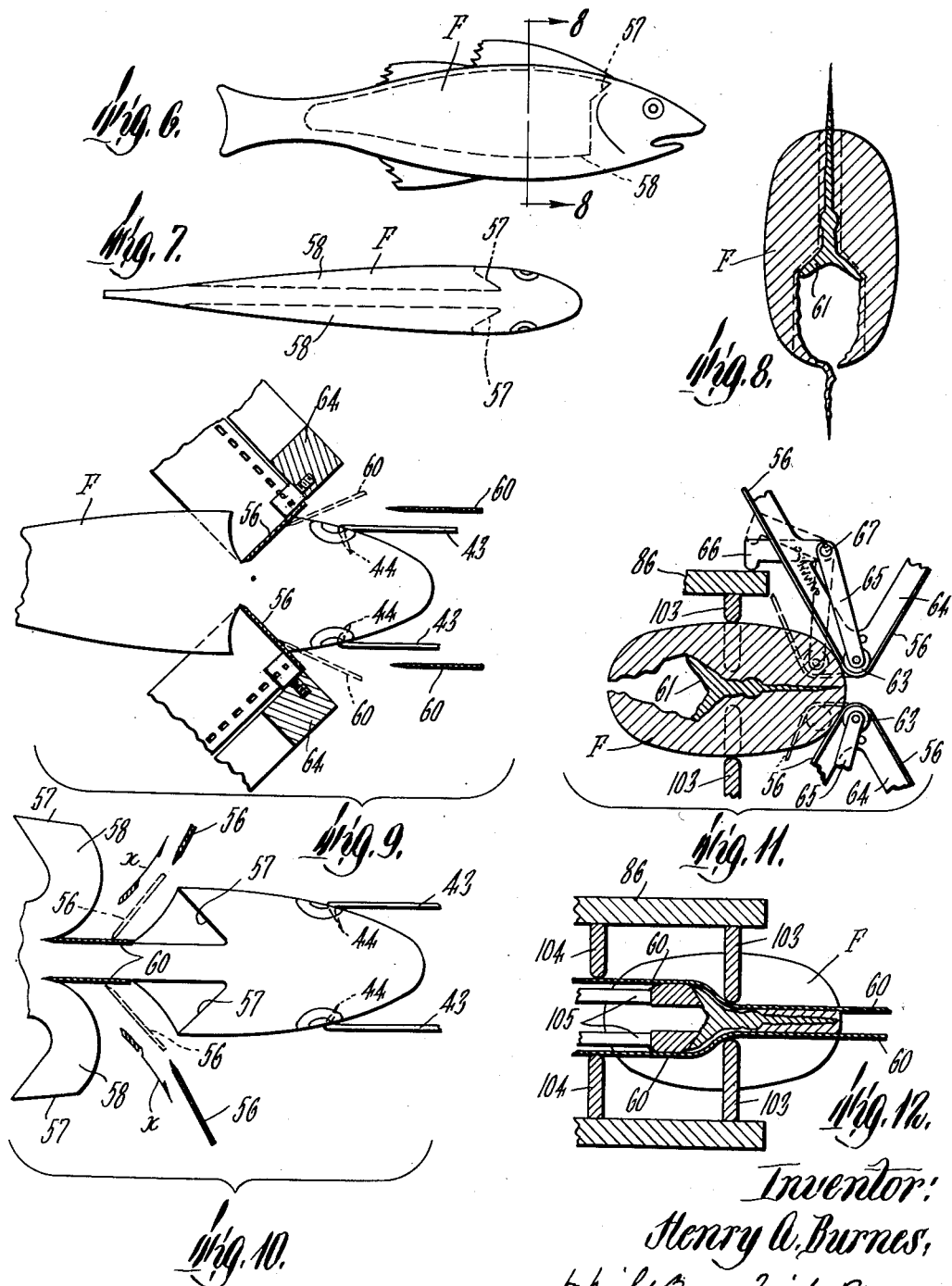

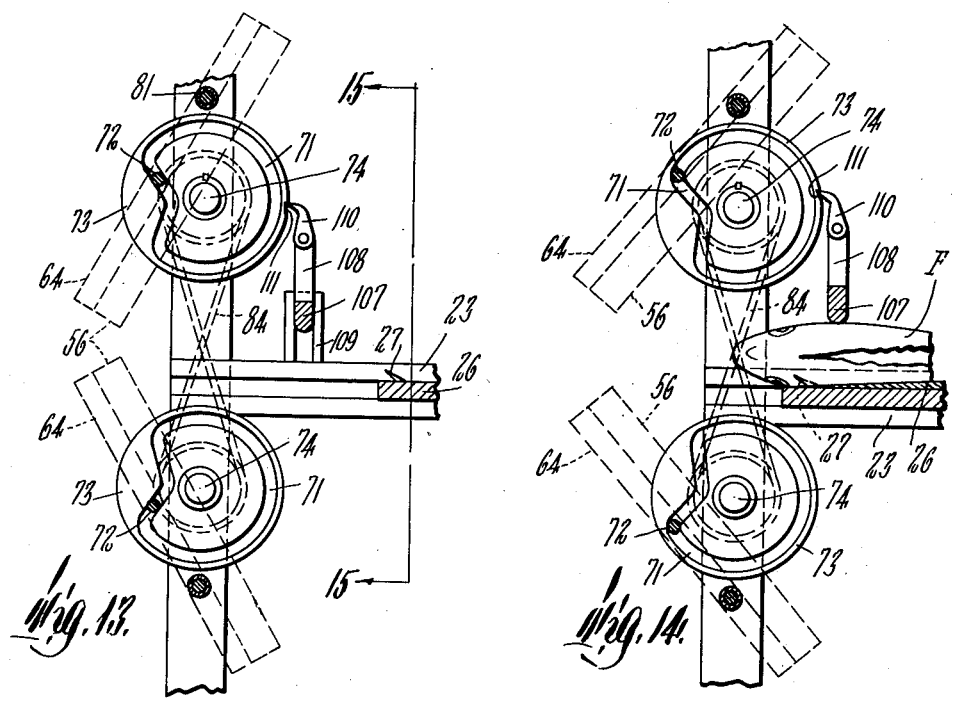
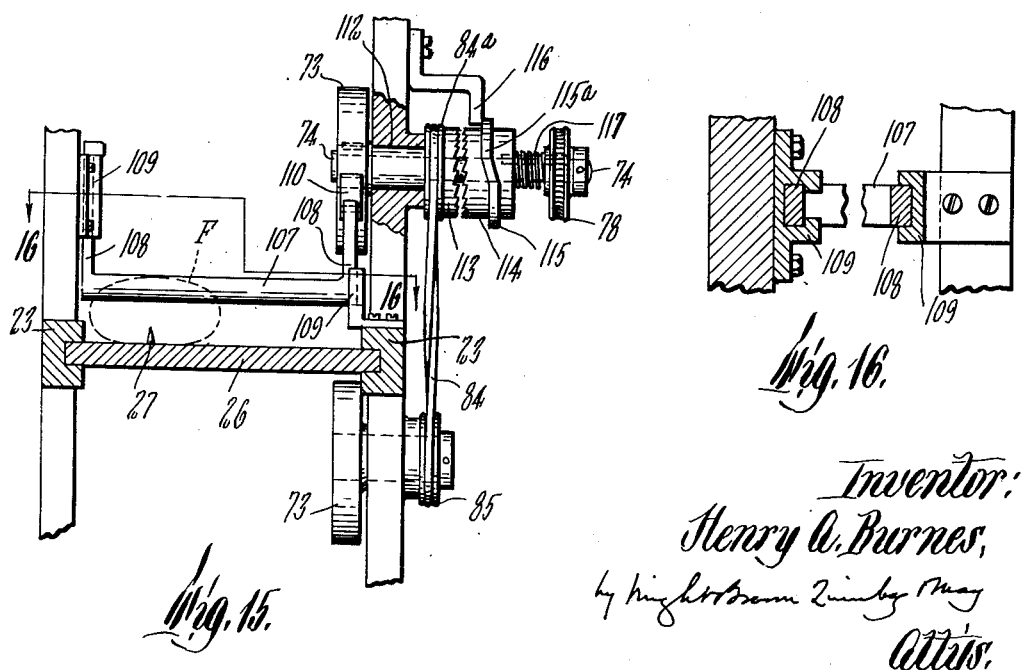

1,908,283

UNITED STATES PATENT OFFICE

HENRY A. BURNES, OF BOSTON, MASSACHUSETTS, ASSIGNOR OF FORTY-EIGHT ONE-HUNDREDTHS TO JEREMIAH F. MURPHY, OF BOSTON, MASSACHUSETTS

FISH FILLETING MACHINE

Application filed August 13, 1929, Serial No. 385,599. Renewed June 19, 1931.

The object of this invention is to provide an improved machine adapted to sever from the bony structure of a fish, which includes a backbone and a bony enlargement at the forward end portions thereof, the two edible side portions known as fillets, leaving the head, tail and bony structure, the machine being provided with means for so cutting the fillets as to include therein edible portions at opposite sides of the head, which have heretofore been either wasted or severed by a separate operation performed by hand, the fillets being severed simultaneously, and the machine being provided with automatic means whereby flexible band knives constituting the cutting means are positioned properly, whether cutting a large or a small fish.

Of the accompanying drawings forming a part of this specification,—

Figure 1:
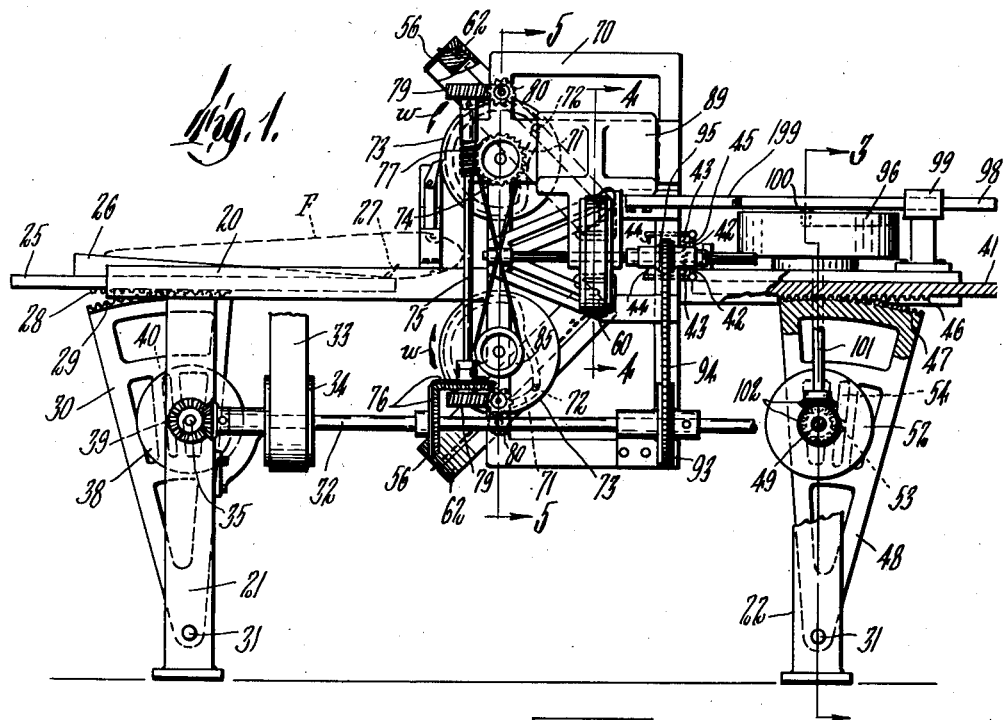
Figure 1 is a side elevation of the machine.

Figures 3, 4 and 5 are sections taken on the lines 3—3, 4—4 and 5—5 of Figure 1.

Figure 3a is a sectional view, showing a modification.

Figures 6 and 7 is a side elevation and top plan view respectively of a fish showing by dotted lines the shape of the fillet which is to be cut.

Figure 8 is a section on line 8—8 of Figure 6.

Figure 9 is a side elevation of a fish showing the beginning of the cut made by the upper and lower band knives.

Figure 10 is a similar view, showing the path taken by the center band knife during the cutting operation.

Figure 11 is a section similar to a portion of Figure 5, showing by full and dotted lines the path taken by the upper and lower band knives in making the first cut on the fish.

Figure 12 is a section similar to a portion of Figure 5, showing the fish's backbone in section, and the manner in which the central band knife is flexed to cut the meat close to the bone.

Figure 13 is a section on line 13—13 of Figure 5, showing the mechanism for adjusting the band knife to the correct position for beginning the cut on the fish.

Figure 14 is a similar view, showing the fish in the position which moves the parts to the correct position so that the band knife begins to cut in the proper place.

Figure 15 is a section on line 15—15 of Figure 13, showing the clutch for rotating the parts.

Figure 16 is a section on line 16—16 of Figure 15.

The same reference characters indicate the same parts in all of the figures.

The frame of the machine includes a top composed of spaced apart horizontal members 20, and legs 21 at one end of the top, and legs 22 at the opposite end. The inner edges of the top members 20 are grooved and constitute opposed guides 23 (Figure 2) at the forward end portion of the top, and opposed guides 24 at the opposite end portion. Movable horizontally in the guides 24 is a fish-carrying slide 25, having an inclined bed 26, adapted to support a fish F, such as a cod or a haddock, lying on one side, the inclination of the bed being such that, owing to the taper of the fish from head to tail, the backbone of the fish is in a substantially horizontal plane.

Figure 2:
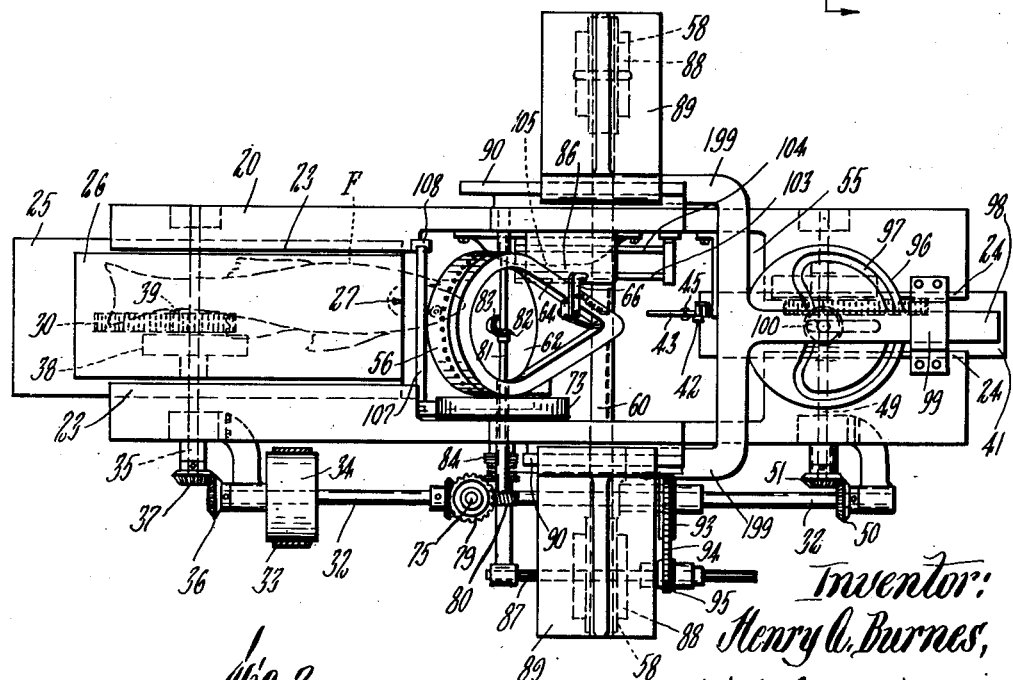
Figure 2 is a top plan view of the machine.

One end of the bed 26 is provided with a spur 27, which enters the under side of the head and causes endwise movement of the fish with the bed, when the latter is projected horizontally to the right from the position shown by Figures 1 and 2.

The bottom of the fish-carrying slide 25 is provided with a horizontal rack 28, meshing with a segmental rack 29 on the upper end of an oscillatory actuating arm 30, whose lower end is connected with the legs 21 by a pintle-rod 31, so that the arm 30 is adapted to oscillate in a vertical plane, and alternately project and retract the fish-carrying slide 25.

The means for oscillating the actuating arm 30 includes a longitudinal main shaft 32, which actuates other elements of the machine, as hereinafter described, and may be driven by a belt 33, running on a pulley 34 fixed to the shaft, a transverse shaft 35 connected by bevel gears 36 and 37 with the main shaft 32, and a disk 38 fixed to the transverse shaft 35 and provided with a wrist-pin 39, which enters a slot 40 in the arm 30.

Movable horizontally in the guides 24 of the frame top is a fish-pulling slide 41, having a pair of oppositely projecting vertically arranged ears 42, to which are pivoted a pair of jaws 43, having barbs 44 adapted to engage opposite sides of the fish head, as by entering the eyes, as indicated by Figure 9, the jaws being normally pressed toward each other by springs 45, and so arranged that they will automatically engage the head when the pulling slide is projected or moved to the left from the position shown by Figures 1 and 2.

To the under side of the pulling slide 41 is fixed a rack 46 (Figure 1), meshing with a segmental rack 47 on an actuating arm 48, similar to the arm 30, and oscillated in a vertical plane by means including a transverse shaft 49, connected by bevel gears 50 and 51, with the main shaft 32, a disk 52 fixed to the transverse shaft and having an eccentric wrist-pin 53 entering a slot 54 in the actuating arm 48.

The amplitude of oscillation of the arm 48 is such that the pulling slide is projected to the left from the position shown by Figures 1 and 2, sufficiently to cause the jaws 43 to engage the fish head projected by the carrying slide 25, and then retracted to pull the fish to the right.

The frame top is provided with an opening between the pairs of guides 23 and 24, said opening being designated by 55 in Figure 2, and providing a cutting space in which the several band knives hereinafter described are operated to sever fillets from the fish.

Three band knives are provided which include an upper and a lower nicking knife, each designated by 56, these knives being adapted to enter the upper and lower sides of the fish, as best shown by Figure 9, and first form therein oblique nicks (Figure 7) just behind the gills, the nicks forming the forward ends of the fillets 58, subsequently severed from opposite sides of the backbone 59 of the filleting knives next described.

The third band knife is designated by 60, and is the filleting knife. Said knife, which is best shown by Figure 4, is adapted to enter the nicks 57 beside the nicking knives, as indicated by Figures 9 and 10, and be caused by the endwise movement of the fish to sever the fillets 58 in planes parallel with the backbone, the filleting knife extending crosswise of the machine and having two substantially parallel stretches, as shown by Figure 4. The flexibility of the filleting knife stretches is such that they may be abruptly flexed, as indicated by Figures 11 and 12, to form cuts conforming to the widened arched portion 61 of the bony structure of the fish at the forward end portion of the backbone, the object being to eliminate waste of the edible material.

The nicking band knives 56 are supported by sprocket wheels whose teeth engage slots cut in the knives, and small idle pulleys 63, which are movable as indicated by full and dotted lines in Figure 11, to vary the paths of the knives.

The sprocket wheels 62 and idle pulleys 63 are carried by oscillatory tapering frames 64, best shown by Figure 2, the sprocket wheels 62 being journaled in bearings on the wider end portions of said frames, and the idle pulleys 63 being at the narrow ends and mounted on bell-crank levers composed of arms 65 and 66, pivoted at 67 to ears on the frames 64, as best shown by Figure 2.

The frames 64 are provided with trunnions 68 and 69 (Figure 5) journaled in fixed extensions 70 of the machine frame, the arrangement being such that the frames are oscillatable, to cause the different positions of the idle pulleys 63, indicated by Figure 11, by cam grooves 71 (Figure 1), receiving trundle rolls or studs 72 on the frames, the cam grooves being formed in cam disks 73 fixed to shafts 74.

The cam disks and the sprocket wheels thereon are rotated by mechanism including a vertical shaft 75 (Figure 1), connected by bevel gears 76 with the main shaft 32, and having a worm 77 meshing with a worm gear 78 on the shaft 74 of the upper cam disk, upper and lower helical gear 79, meshing with upper and lower helical gears 80 on transverse upper and lower shafts 81, journaled in bearings on the trunnions 68, and provided with bevel gears 82 (Figure 2) meshing with a bevel gear 83 on the axes of the upper and lower sprocket wheels. The shaft 81 is preferably flexible.

The upper cam disk 73 is rotated by the worm 77 and worm gear 78, and the lower cam disk is rotated by a crossed belt 84 (Figure 1) running on a pulley 84a (Figure 15), and on a pulley 85, fixed to the lower transverse shaft 74, the cam disks 73 being rotated in opposite directions, as indicated by the arrows w in Figure 1.

The described mechanism moves the adjacent ends of the oscillatory frames toward each other when the fish is advanced from the position indicated by Figures 1 and 2, to cause the portions of the knives 56 on the idle pulleys 63 to assume the positions shown by Figure 9, and cut the nicks 57 (Figure 7) while the fish is being advanced. At the same time the idle pulleys are shifted from the full line to the dotted line positions shown by Figure 11, to change the contour or path of the nicking knives by contact of the bell-crank lever arms 66 with fixed horizontal ledges 86 (Figure 11).

The sprocket wheels 58, carrying the filleting knife 60, are fixed to shafts 87 (Figure 4) which are journaled in ears 88 on brackets 89, mounted to slide endwise of the machine on fixed guides 90, one of said ears being mounted to slide crosswise of the machine on guides 91, on the accompanying bracket, and normally pressed outward by a spring 92 (Figure 4), so that the knife 60 is suitably tensioned and its cutting stretches in the path of the fish are adapted to be moved toward and from each other to permit the flexure of said stretches indicated by Figure 12.

One of the sprocket wheels 58 is positively driven, and the other loose, the driven wheel being shown at the right in Figure 1, and at the bottom of Figure 2. The mechanism for driving the driven sprocket wheel includes a sprocket and chain drive 93, 94 and 95 (Figures 1 and 2) connecting the main shaft 32 with the shaft 87 of the driven sprocket wheel.

After the nicking knives have entered the sides of the fish and before their withdrawal therefrom, the stretches of the filleting knife 60 are moved edgewise from the positions shown by full lines in Figure 9, toward the nicking knives, and are deflected by the latter so that they enter the nicks and are first transversely inclined by the nicking knives as indicated by dotted lines in Figure 9, the movement of the stretches being continued until they assume the positions shown by full lines in Figure 10. The nicking knives 56 are then withdrawn in the direction of arrow X (Figure 10), as indicated by dotted and full lines, and the stretches of the filleting knives are caused by the endwise movement of the fish to sever the fillets. The above described edgewise movement of the filleting knife is caused by mechanism including a cam disk 96, having a cam groove 97, formed as shown by Figure 2, and a slide 98, movable in a fixed guide 99 and having a stud or trundle roll 100, entering the cam groove 97.

The slide 98 has angular arms 109 fixed to the brackets 89. The movements of the slide caused by the cam groove 97 cause movements of the brackets 89 on the guides 90, so that the filleting knife stretches 60 are caused to enter the nicks formed by the nicking knives, as described, the cam groove 97 having a dwell portion which holds the filleting knife in the position shown by Figure 10 while the fillets are being severed.

The cam disk 96 is fixed to a vertical shaft 101, which is connected by bevel gears 102 with the shaft 49, the latter being driven, as before described, by the main shaft 32. The portions of the stretches of the filleting knife 60 which pass across the arched portion 61 of the bony structure, are flexed as shown by Figure 12, by the conjoint action of two pairs of fixed knife guides 103 and 104, and a fixed distending member 105.

The guides 103 have parallel guiding edges bearing on the knife stretches and spaced apart to conform approximately to the maximum thickness of the back bone, and the guides 104 have curved non-parallel edges, portions of which are spaced apart to conform approximately to the width of the bony portion 61. The distending member 105 projects into the slit made in the belly of the fish by the cleaning operation, and is of about the same width as the bony portion 61. When the filleting knife is moved edgewise as before described, portions of its stretches are caused by the guides 103 to approach the back bone, as shown at the right in Figure 5, and other portions are caused by the distending member 105 to bear on the edges of the guides 104, and are flexed across the bony portion 61. When said portion has passed away from the knife stretches, the guides 104 guide the outwardly flexed portions of said stretches inwardly toward each other, so that they are in the same planes with the stretches at opposite sides of the backbone, the edges of the guides 104 being suitably curved, so that portions of said edges are closed together at portions of the guides than at other portions.

To enable the nicking knives 56 to properly nick the sides of fishes of different sizes, I provide automatic mechanism governed by the thickness of the fish, for varying the initial positions from which the inner ends of the frames 64 commence to swing inward to cause the described action of the nicking knives. The length of the fish and its head vary with its thickness, so that the automatic mechanism causes the nicking knives to form the nicks at a suitable distance from the nose in a fish of any size.

Said automatic mechanism is best shown by Figures 13, 14 and 15, and includes a stroking bar 107 having runners 108 at its opposite ends which are slidable in fixed vertical guides 109. The stroking bar is adapted to bear lightly on the upper side of the fish F, and to be raised by the slope of said side, so that the endwise movement of the fish raises the bar, as will be seen by comparing Figure 13 with Figure 14.

To one of the runners 108 is pivoted a pawl 110, engaging a ratchet tooth or notch 111 on the periphery of the upper cam disk 73. When the bar 107 is raised by a fish, the pawl 110 imparts to the disk 73 a partial rotation, depending on the thickness of the fish, so that the adjacent ends of the frames 64 are spaced farther apart when a relatively thick and large fish is present, than when the fish is thinner and smaller.

The upper cam disk 73 is fixed to a sleeve 112 (Figure 15) in which the upper shaft 74 is adapted to rotate loosely. To the sleeve 112 is fixed a toothed clutch member 113 (Figure 15). A complemental clutch member 114, engaged with and continuously rotated by the shaft 74 is movable on the shaft into and out of engagement with the clutch member 113 by an annular cam, and a fixed cam abutment 116. The cam has two peripheral portions 115 and 115a, offset from each other and pressed by a spring 117 against the abutment 116. When the portion 115a bears on the abutment, the clutch members are separated, as shown by Figure 15, and when the portion 115 bears on the abutment, the clutch members are pressed together by the spring.

It will be understood that the thickest portion of the fish determines the adjustment of the nicking knife frames while the studs 72 are in the dwell portions of the cam grooves 71, and the frames are at rest, and that the frames are moved to cause the nicking knives to cut while the fish is being moved forward from the position shown by Figure 14.

The fish having been previously cleaned, but with the head and tail left on, is laid on the inclined surface of the supporting slide 25.

The fish is then projected to the right and into the cutting space 55 of the machine, having first raised the stroking bar 107.

The nicking knives 56 are arranged to cut nicks in the upper and lower sides of the fish at the head portion thereof, and thus form the forward ends of the fillets, and the filleting knife 60 cuts the fillets from head to tail, the upper and lower fillets being cut simultaneously.

The cutting edges of the nicking knives are forced into the upper and lower sides of the fish, to start the cutting operation, and then withdrawn out of the way.

Figure 4 shows the filleting knife 60 when its stretches are separated to the maximum extent.

The spring-pressed jaws 43 grasp the fish by entering its eyes and draw it past the filleting knives. The jaws are tripped and caused to open after the fillets are severed, allowing the skeleton to drop down into a receptacle under the cutting space.

In a small fish the side nicks are cut at a suitable distance behind the forward end of the head, and in a larger fish the nicks are cut at a greater distance. As the fish is projected, it passes under the stroking bar 17 and raises it to cause the automatic adjustment of the nicking knives above described. The stroking bar drops after the fish has passed from under it, to the position shown in Figures 13 and 15. If the next fish is smaller than the one preceding, it imparts to the stroking bar 107 a shorter upward movement, so that the nicking knives are severing through smaller areas.

If a larger size fish is to be filleted, it raises the stroking bar higher and the nicking knives are adjusted inwardly a greater distance than before, so that when the nicking knives are swung inwardly to cut the nicks, they start at a greater distance from the tip end of the fish than they did for the smaller one. The fish held in the supporting slide 25 by the spur 27, is projected into the cutting space 55. As the slide 25 moves forward, the pulling slide 42, first moves to meet it, the jaws 43 fasten themselves in the fish's eyes. The pulling slide then moves outwardly, or to the right in Figure 1, and pulls the fish across the knives, and the supporting slide returns for another fish.

The two nicking knives form the nicks in the fish just behind its head, as shown in Figure 9. The filleting knife cutting on both sides of the backbone, is projected to the left by the mechanism which includes the cam 96, and on striking the nicking knives, is flexed toward the fish's backbone, and then on passing the nicking knives, its stretches approach the backbone and remain close to it to the end of the cut.

Figure 11 shows in full lines the start of the cut on the fillet. As the nicking knives swing toward the center, the bell-crank lever 65, 66 gradually causes said knives to take the dotted line position shown.

The knives may be kept sharp by means of small rolls 150 of abrasive material, mounted as shown in Figures 4 and 5. The rolls used to sharpen the filleting knife are fixed to the machine frame and arranged so that they bear one on each side of the knife. The rolls for sharpening the nicking knives are mounted on the oscillatory frames carrying said knives, so that a roller bears on each side of the blade. The resulting water and oil from the filleting operation furnishes the necessary lubricant.

The cam disk 96, instead of being driven by the connections shown by Figure 3, between it and the shaft 49, may be driven by the connections shown by Figure 3a, said connections including a bevel gear 116, fixed to the outer end of the shaft 49 and a vertical shaft 117 having a bevel gear 118 at one end meshing with the gear 116, and a spur gear 119 at the opposite end meshing with gear teeth 120 on the periphery of the cam disk.

It will be seen that each of the endless flexible blades is associated with driving means positively engaged with the blade to impel the same, and with flexing means spaced from the driving means and adapted to bear on a portion of the blade out of contact with the driving means, and convert said portion into an acting portion formed to make a cut of predetermined contour in a fish.

The driving means associated with each nicking blade 56 is embodied in the driving pulley 62, and the flexing means is embodied in the small idle pulley 63. The driving means associated with the filleting knife 60 is embodied in the pulleys 58, and the flexing means is embodied in the parts 103, 104 and 105.

I claim:

1. A filleting machine comprising, in combination, means for moving a fish endwise with its backbone in the plane of its movement, a pair of nicking band knives, arranged to cut nicks in opposite sides of the head portion, and mechanism for operating said knives, including means for abruptly flexing portions thereof to enable said portions to cut curved nicks, means for oscillating said knives through predetermined arcs, and means for driving the knives.

2. A filleting machine comprising, in combination, means for moving a fish endwise with its backbone in the plane of its movement, a pair of nicking band knives, arranged to cut nicks in opposite sides of the head portion, and mechanism for operating said knives, including means for abruptly flexing portions thereof to enable said portions to cut curved nicks, means for oscillating said knives through predetermined arcs, means for driving the knives, and means governed by the size of the fish for adjusting the extremes of the arcs through which said knives oscillate.

3. A filleting machine comprising, in combination, means for moving a fish endwise with its backbone in the plane of its movement, a pair of nicking band knives, arranged to cut nicks in opposite sides of the head portion, and mechanism for operating said knives, including means for abruptly flexing portions thereof to enable said portions to cut curved nicks, means for oscillating said knives through predetermined arcs, means for driving the knives, and means actuated by oscillating movements of said knives for changing the contour thereof while they are nicking.

4. A filleting machine comprising, in combination, means for moving a fish endwise with its backbone in the plane of its movement, a pair of nicking band knives arranged to cut nicks in the opposite sides of the head portion, and mechanism for operating said knives including oscillatory tapered frames having sprocket wheels journaled in the wider portions of said frames, and engaging the knives to drive the same, smaller wheels located at the narrower portions of the frames and abruptly flexing the knives, means for oscillating said frames to cause their narrower ends to approach each other and cause the abruptly flexed portions of the knives to nick the fish, and means for driving the sprocket wheels.

5. A filleting machine comprising, in combination, means for moving a fish endwise with its backbone in the plane of its movement, a pair of nicking band knives arranged to cut nicks in the opposite sides of the head portion, and mechanism for operating said knives including oscillatory tapered frames having sprocket wheels journaled in the wider portions of said frames, and engaging the knives to drive the same, smaller wheels located at the narrower portions of the frames and abruptly flexing the knives, means for oscillating said frames to cause their narrower ends to approach each other and cause the abruptly flexed portions of the knives to nick the fish, means for driving the sprocket wheels, and means for changing the contour of the abruptly flexed portions of the knives while they are nicking the fish.

6. A filleting machine comprising, in combination, means for moving a fish endwise with its backbone in the plane of its movement, means for nicking opposite sides of its head portion to start filleting cuts, a filleting band knife, means for supporting the knife to form two yieldingly tensioned flexible cutting stretches arranged at opposite sides of the path of movement of the backbone, and means for varying the contour of said stretches to enable the same to first cut outside the wide portion of the body structure at the forward end of the backbone, and then close to and parallel with the major portion thereof, the filleting knife stretches being adapted to enter the nicks formed by the nicking means.

7. A filleting machine as specified by claim 6, the means for supporting the filleting knife including sprocket wheels engaging the knife to drive the same, one of said wheels being positively driven, the machine comprising also mechanism for reciprocating the sprocket wheels sidewise to impart edgewise movements to the filleting knife and force its stretches into the nicks.

8. A filleting machine as specified by claim 6, the means for supporting the filleting knife including sprocket wheels engaging the knife to drive the same, one of said wheels being positively driven, the machine comprising also mechanism for reciprocating the sprocket wheels sidewise to impart edgewise movements to the filleting knife and force its stretches into the nicks, one of said sprocket wheels being movable toward and from the other and pressed yieldingly away from the other to impart a yielding tension to the filleting knife.

9. A filleting machine comprising, in combination, a supporting frame having a cutting space between its ends, a fish-supporting slide movable in one end portion of the frame, into one side of the cutting space, a fish-pulling slide movable in the opposite end portion of the frame into the opposite side of said space, mechanism for reciprocating said slides to first move the slides into the cutting space, and then out of the same, the slides being moved in opposite directions, a plurality of flexible band knives movable in said space, means for driving said knives, and means for flexing the knives while they are being driven.

10. A filleting machine as specified by claim 9, the slides-reciprocating mechanism being embodied in an oscillatory actuating arm geared to the supporting slide, an oscillatory actuating arm geared to the pulling slide, and means for simultaneously oscillating said arms.

11. In a filleting machine, in combination, a single endless filleting knife, wheels supporting said knife in flexible stretches extending side by side, means for driving at least one of said wheels, and flexing means engaging said stretches at points between the supporting wheels, said flexing means having elements conforming portions of said stretches to the bony structure which includes the backbone of a fish, and the bony enlargement at the forward end portion thereof, the arrangement being such that said stretches have substantially parallel major portions conforming to the opposite side of the backbone, and angular oblique portions conforming to said enlargement, and adapted to sever edible matter therefrom with a minimum of waste.

In testimony whereof I have affixed my signature.

HENRY A. BURNES.